A. DOBLE.
STEAM AUTOMOBILE.
APPLICATION FILED JAN. 4, 1917.

1,317,780. Patented Oct. 7, 1919.
2 SHEETS—SHEET 1.

Witnesses:
Maurice Goldberger.

Inventor:
Abner Doble.
by Charles L. Bulkley, Atty.

A. DOBLE.
STEAM AUTOMOBILE.
APPLICATION FILED JAN. 4, 1917.
1,317,780.
Patented Oct. 7, 1919.
2 SHEETS—SHEET 2.
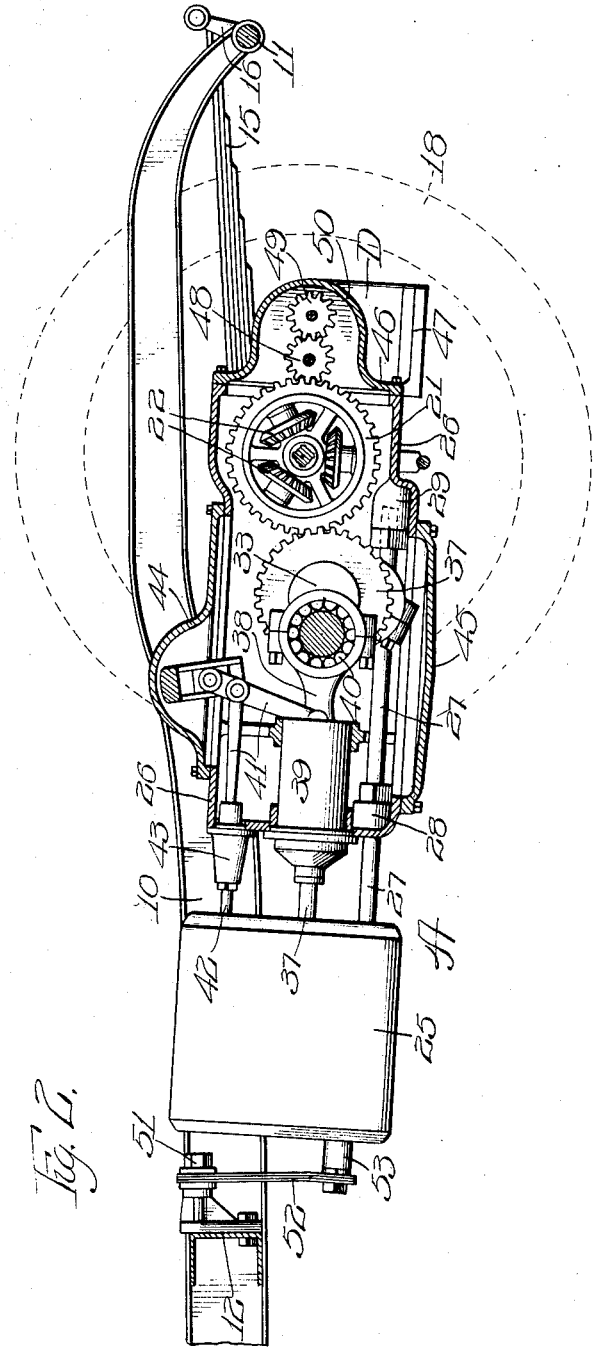

UNITED STATES PATENT OFFICE.

ABNER DOBLE, OF DETROIT, MICHIGAN, ASSIGNOR, BY MESNE ASSIGNMENTS, TO DOBLE-DETROIT STEAM MOTORS CO., OF DETROIT, MICHIGAN, A CORPORATION OF DELAWARE.

STEAM-AUTOMOBILE.

1,317,780.   Specification of Letters Patent.   Patented Oct. 7, 1919.

Application filed January 4, 1917. Serial No. 140,497.

*To all whom it may concern:*

Be it known that I, ABNER DOBLE, a citizen of the United States of America, and resident of Detroit, Wayne county, Michigan, have invented a certain new and useful Improvement in Steam-Automobiles, of which the following is a specification.

My invention relates to improvements in steam propelled automobiles.

My object is to improve the mounting of the engine with respect to the frame of the vehicle and the driving relation of the engine, rear axle and dynamo or generator, my object being to provide an improved structure which will be simple, durable and reliable, and which will be effective and efficient in operation.

Other objects of my invention will appear hereinafter.

My invention consists in the features of novelty exemplified by the construction, combination and arrangement of parts hereinafter described, shown in the accompanying drawings, and more particularly pointed out in the appended claims.

Referring to the drawings:

Fig. 2 is a view in longitudinal section, some of the parts being shown in elevation.

Figure 1:
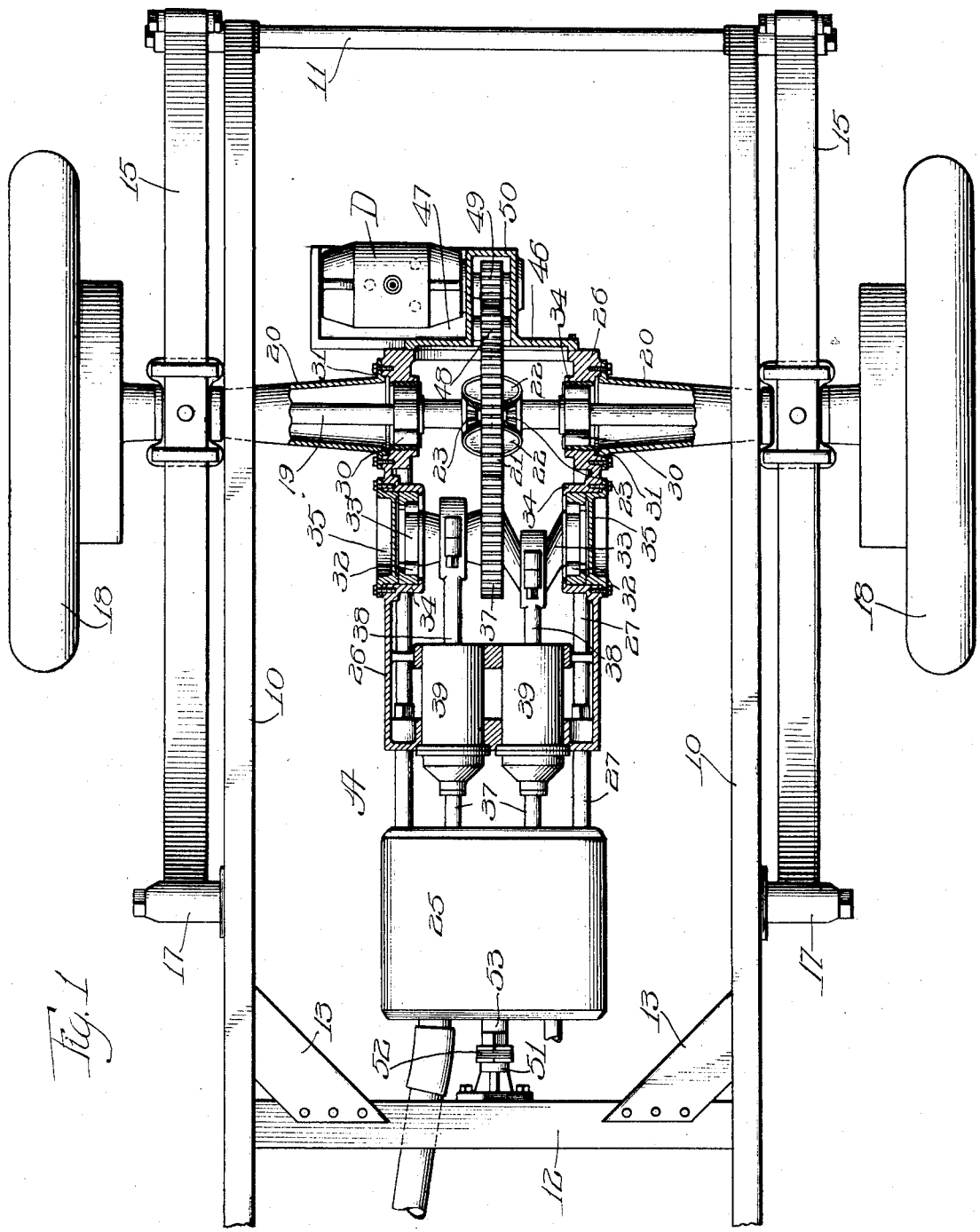
Figure 1 is a plan view of the rear portion of a steam automobile chassis, the body being removed and the engine casing being shown in section to better disclose the parts.

In the drawings I have shown the rear portion of a typical automobile frame embodying side members 10, a rear cross rod 11 and an intermediate cross beam 12, the side members and cross beam being rigidly braced by the diagonal plates 13. The rear portions of the frame side members rise above the plane of the rest of the frame to provide additional clearance between the frame and the rear axle parts associated therewith, and the rear ends droop downwardly and are supported by the springs 15. At their rear ends these springs are connected to short links 16 which are connected to the projecting ends of the rear cross rod 11. The forward ends of the springs are pivotally connected to outstanding lugs 17 on the outside of the side beams 10 of the frame. These springs are preferably of the usual laminated or leaf construction and of the usual semi-elliptical type and yieldingly support or suspend the frame relatively to the rear axle structure of the vehicle.

The vehicle is provided with two rear wheels 18 secured to the outer end of the rear axle 19 in the usual manner. The rear axle is inclosed in the hollow tubular tapered housings 20 and the outer end portions thereof are journaled in suitable bearings (not shown) in these housings. Midway of the length of the axle is a differential mechanism which may be of any suitable or approved character for the purpose. The differential shown in the drawings consists of a main gear 21 having a plurality of planetary miter gears 22 mounted therein, these miter gears having their axes radially disposed at 120 degrees apart and at right angles to the axis of said main gear. These miter gears mesh with and drive a pair of miter gears 23 on the adjacent inner ends of the two axle sections. The propelling engine A is mounted on this rear axle structure and embodies in general two steam cylinders and valve chests therefor all of which are formed as a compact unitary structure 25. This structure is connected to a crank casing 26 by means of two heavy rods or bars 27 which maintain the cylinder structure and crank casing in rigid inflexible relation. These rods extend through long bearings 28 in the forward wall of the crank case and terminate in large sockets 29 integrally formed in the rear portion of said casing for the purpose of increasing this rigid relationship. The rear portions of the side walls of the crank case have enlarged openings in which are mounted large substantial roller bearings 30 for the inner end portions of the axle sections, these bearings being near the differential and well adapted to resist the thrusts and strains on the structure. The inner ends of the tubular axle housings are provided with annular flanges 31 which are detachably bolted to the walls of the crank case. Just forward of the axle bearings is another set of roller bearings 32 which support the ends of the crank shaft 33. The mountings for these bearings as well as the axle bearings heretofore described are formed by circular instanding bosses 34 which are cast integrally with the walls of the crank case. In order to make these bearings dust and dirt proof, and yet accessible, I provide cap plates 35 which cover the bearing openings, these plates being set into the said openings and being detachably fastened in place by means of their flanges and the bolts.

The crank shaft carries a gear 37 which meshes with and drives the main gear 21 of the differential and thus transmits the power of the engine directly to the differential, this gear being practically of the same size and ratio. The crank shaft is driven by the piston rods 37 and connecting rods 38 in accordance with any suitable or approved construction. In this case the piston rods extend through suitable bearings in the forward end wall of the casing and operate crossheads in the crosshead guides 39 formed integrally with the casing. The connecting links are connected at one end to the crossheads and at their other end to the crank shaft, suitable ball or roller bearings 40 being provided for this purpose. The valves in the steam chests are operated by the valve gear 41 and valve rods 42, the latter extending through suitable glands 43 in the forward wall of the casing. The top and bottom walls of the crank case have large openings by which access can be readily had to the interior of said casing, but these openings are covered and sealed by plates 44 and 45 respectively which are securely bolted in place. The rear wall of the casing is formed by a plate 46 which is removably bolted in place, and this plate has an outstanding horizontal shelf or bracket 47 preferably integral therewith. This shelf forms a support or mounting for an electric generator D of suitable construction. This generator or dynamo is used for supplying current for the various electrical equipment employed in automobiles and in itself needs no particular description. It is driven, however, from the differential by means of the two intermeshing gears 48 and 49, the gear 48 meshing with and being driven by the main differential gear 21, but these gears are completely housed or inclosed by the outstanding compartment 50 formed integrally with the rear plate. Both of the gears 48 and 49 have bearings in the walls of this compartment 50 and the gear 49 is fastened to the generator shaft which extends through the compartment walls 50.

The engine and power transmission mechanism are thus closely associated with the rear axle and connected in driving relation thereto without the employment of any intermediate mechanism, and the generator is also in direct driven relation to this power transmission mechanism and is closely associated therewith in the complete and compact unit. All of these parts are completely inclosed in a single housing which protects them against dust and grit and this housing provides a suitable container for lubricating oil, and all of the moving parts are contained within this casing in such relation as to be thoroughly and properly lubricated. These parts, however, are readily accessible through the large plate covered openings in the housing. Furthermore the engine and rear axle structure are maintained in sturdy and rigid relation and cannot become relatively displaced or loosened in any way. There is of course a relative movement between the rear axle, engine and the vehicle frame and I provide for this condition by suspending the forward end of the engine from the frame from a single point. The cross beam 12 of the frame has a substantial lug 51 outstanding therefrom and a suspension member 52 is pivotally attached thereto. The lower end of this member is pivotally attached to a lug 53 outstanding from the engine cylinder casting. Thus any relative rotary or lateral movement between the frame and engine is taken care of, and any relative longitudinal movement is provided for by making the suspension member 52 of a series of laminations to render it flexible and capable of yielding to these relative movements. Thus the frame and body of the vehicle are not in any way restricted in their movement and the supporting springs are not affected in their action.

I claim:

1. The combination of a vehicle frame and a rear axle having a differential gear, an electric generator mounted to the rear of said axle, geared to and driven by said differential gear, a steam engine geared to and driving said differential gear, and means supporting said engine, differential and generator in operative relation.

2. The combination of a vehicle frame and a rear axle having a differential gear, an electric generator mounted to the rear of said axle, geared to and driven by said differential gear, a steam engine geared to and driving said differential gear, a common housing inclosing and supporting said engine, gearing, differential and generator gearng in operative relation, and a flexible support from the frame for one end of said engine.

3. The combination of an automobile frame, an axle and supporting wheels therefor, a housing, a differential gear for said axle within the housing, a propelling engine having a crank shaft journaled within and supported by the housing and arranged to drive said differential, and a generator mounted to the rear of said axle and supported by said housing and having driving gears disposed within the housing and meshing with and driven by said differential.

Signed by me at Chicago, Illinois, this 23rd day of November, 1916.

ABNER DOBLE.

Witnesses:
E. H. CLEGG,
AMY JEHLE.